Nov. 17, 1964 L. ZERNOW ETAL 3,157,498
METHOD AND APPARATUS FOR EXPLOSIVELY FORMING
COMPACTS FROM POWDERED MATERIAL
Filed Oct. 23, 1961 2 Sheets-Sheet 1

INVENTORS
LOUIS ZERNOW
IRVING LIEBERMAN
MARTIN CORNEY
BY
ATTORNEY

Nov. 17, 1964  L. ZERNOW ETAL  3,157,498
METHOD AND APPARATUS FOR EXPLOSIVELY FORMING
COMPACTS FROM POWDERED MATERIAL
Filed Oct. 23, 1961  2 Sheets-Sheet 2

INVENTOR.
LOUIS ZERNOW
IRVING LIEBERMAN
BY MARTIN CORNEY

ATTORNEY

United States Patent Office 3,157,498
Patented Nov. 17, 1964

3,157,498
METHOD AND APPARATUS FOR EXPLOSIVELY FORMING COMPACTS FROM POWDERED MATERIAL
Louis Zernow, Glendora, Irving Lieberman, Covina, and Martin Corney, Glendora, Calif., assignors to Aerojet-General Corporation, Azusa, Calif., a corporation of Ohio
Filed Oct. 23, 1961, Ser. No. 146,975
9 Claims. (Cl. 75—226)

This invention relates generally to the formation of solid compacts from powdered refractory material and more particularly to the formation of compacts with a high substantially uniform density.

Heretofore in the practice of forming articles from powdered material, it was customary to compress the powdered material in a mold to form a coherent mass. Then heat from an external source was applied to the mold. By way of example, the heat source was obtained by inserting the entire mold in an oven, or by wrapping a resistance heating coil around the mold, or by inducing high frequency (e.g., 50,000 c.p.s.) eddy currents in the powdered material.

The above-described conventional methods of heating the material in the mold involve substantial investments in complex and bulky equipment. Furthermore, operations involving such equipment are slow and generally expensive.

More recently, technological advances have made it desirable to be able to form compacts from highly refractory powdered materials. However, in many cases, the pressures available through the use of conventional compaction techniques have been inadequate to yield sufficiently high densities to reduce shrinkage deformation during sintering.

What is needed, therefore, and comprises an important object of this invention, is to provide a method and apparatus for quickly and inexpensively forming high density compacts from powdered material.

The invention in its broadest aspect comprises introducing the material to be formed inside a female die. The material is surrounded by an inert gas with a suitably large adiabatic law exponent. Then a male die member is explosively driven into the female die member compressing both the material to be formed and the gas in the female die. The short-time high compression of the produces a very large adiabatic temperature increase which may be on the order of several thousand degrees K. depending on the value of the adiabatic law exponent. The combination of the high temperature and pressure is effective in producing a high density coherent compact of the refractory material.

These and other objects of this invention will become more apparent when read in the light of the specification and the accompanying drawings wherein:

FIGURE 1 is a cross-sectional view showing one embodiment of this invention wherein the male die members are provided with attached explosives for driving them into the female die member;

FIGURE 2 discloses the male die members after being driven into the female die member by the detonation of the explosives;

FIGURE 3 discloses an embodiment of the device shown in FIGURE 1 but using modified male members for producing a variation in the shape of the compact;

Figure 1:
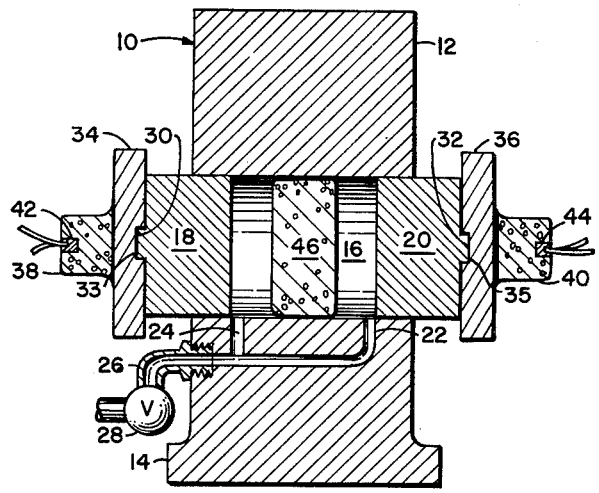

Referring now to FIGURE 1 of the drawings, the apparatus indicated generally by the reference numeral 10 comprises a female die 12 for holding material to be formed therein. In the embodiment shown, the female die is provided with an integrally formed base member 14 although the particular external configuration of the die can be varied as desired. In this particular embodiment the female die is provided with an opening 16 extending therethrough. Male die members 18 and 20 are mounted in the opposite ends of opening 16 for movement toward each other. The die 12 is additionally provided with conduits 22 and 24. Conduits 22 and 24 are connected by any suitable means to a gas pipe 26 in which a gas control valve 28 is mounted.

The male die members 18 and 20 in this particular embodiment may be provided with oppositely facing rectangular bosses 30 and 32. Expendable buffer plates 34 and 36 are each provided with a recess shaped to receive bosses 30 and 32. As shown in FIGURE 1 the bosses 30 and 32 penetrate recesses 34 and 36 of the expendable buffer plates; this holds the buffer plates in position on the outer surfaces of the male die members. Explosives 38 and 40 are attached to the outer surfaces of the expendable buffer plates by any suitable means such as gluing. The explosives may be set off by any conventional igniter or detonator indicated generally by the reference numerals 42 and 44. These igniters or detonators are imbedded in the explosives and may be electrically ignited by connecting the electric wires attached to them to a source of suitable voltage and current.

The material to be formed, indicated generally by the reference numeral 46, may be metallic, non-metallic, organic, etc. This material is placed in opening 16 in the female die. In the particular embodiment shown, the material to be shown, 46, has already been preformed by any suitable means, such as a hydraulic press. It is to be understood that this is not an essential limitation, and opening 16 could be filled with the powdered material itself without preforming. In some circumstances, however, depending in part on the shape of the material being formed, a preliminary preforming operation results in an improvement in the characteristics of the compacted formed product. The interior opening 16 is filled by means of gas pipe 26, valve 28, and conduits 22 and 24 with a suitable gas. This gas is preferably monatomic and is inert to the material being formed. In addition, the gas is selected so it has a suitably high adiabatic law exponent such as argon, although helium, neon, krypton, and xenon could be used.

When the explosives 38 and 40 are detonated, the male die members are driven into the female die member 12 and toward each other with explosive violence, compressing the material 46 being formed and the monatomic gas therebetween. The compression of the gas in the female die produces a temperature rise. The magnitude of this temperature rise is governed by the following law:

$$\frac{T_2}{T_1} = \left(\frac{P_2}{P_1}\right)^{\frac{\alpha-1}{\alpha}}$$

where $T_2$ = final temperature
$T_1$ = initial temperature
$P_2$ = final pressure
$P_1$ = initial pressure
$\alpha$ = adiabatic law exponent ($C_p/C_v$)

where $C_p$ is the specific heat of the gas at constant pressure and $C_v$ is the specific heat of the gas at constant volume.

The adiabatic law exponent for argon gas has a value of approximately 1.66 If the pressure rise in the female die due to the movement of the male die members toward each other has a value of 1000 (a reasonable figure) the increase in temperature will be about 4000° K. In instances where a high pressure is desired but a lower temperature is required, a diatomic gas such as air or nitrogen could be used. Diatomic gases have a lower adiabatic law exponent than monatomic gases, hence their heat rise on compression is lower.

The extremely short action time and the high pressure developed by the high energy compaction due to the high pressure developed by the high explosive detonation, produce temperatures which can approach the melting point of the material in the female die. In addition, frictional phenomena, as well as energy transformations occurring during plastic deformation, are additional sources of thermal energy which can contribute to the process.

In some instances the high temperatures obtainable by utilizing the principles disclosed above are still insufficient to adequately sinter certain materials. These materials would include certain refractory oxides such as hafnium oxide. In such a case, if the powdered refractory oxide is mixed with a metal having a somewhat lower melting point, and the mixture is explosively compressed in the female die as described above, the temperatures would be sufficient to melt or sinter the metal particles. These metal particles serve as a skeleton framework in which the refractory oxide material is embedded. This procedure provides a means for extending the use of the above-described apparatus to materials whose melting point is too high to be sufficiently affected by the adiabatic compression described above.

Figure 2:
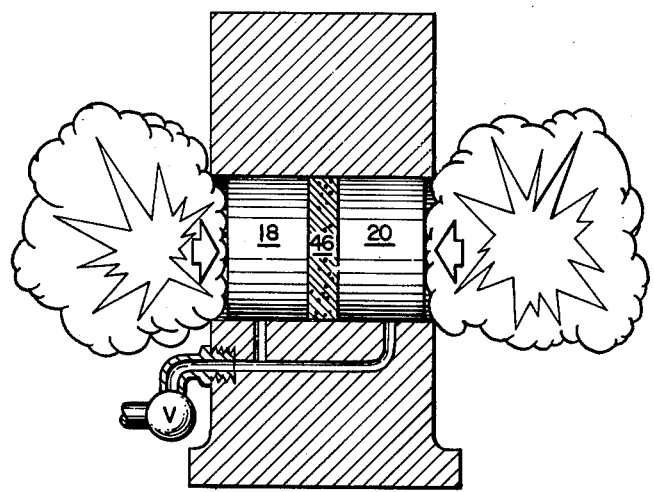
Figure 3:
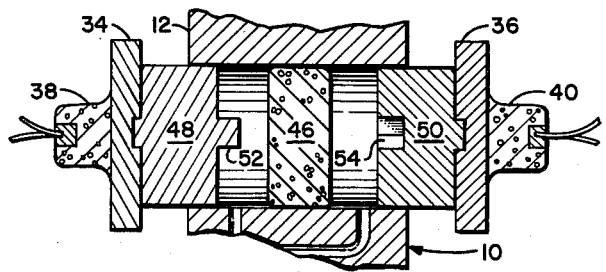
Figure 5:
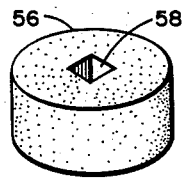
FIGURE 5 is a perspective view of a compact formed by the operation of the apparatus shown in FIGURE 4.
Figure 4:
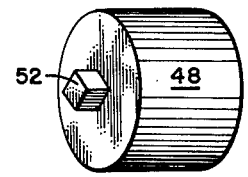
FIGURE 4 is a perspective view disclosing one of the modified male die members.

The material 46 described in FIGURES 1 and 2 is compressed into a solid plate-like form. It is apparent, however, that by varying the shape of the male or female dies the configuration of the compact can be varied. For example, as shown in FIGURE 3, the apparatus 10 has been provided with modified male dies 48 and 50. In this embodiment male die 48 is provided with a rectangular-shaped boss 52 while male die 50 is provided with a rectangular-shaped recess 54 for receiving the tip of the boss 52. In other respects, the operation of the device is the same and when the explosive charges 38 and 40 are detonated, the male die members are driven toward each other with enough force so that boss 52 penetrates the material 46 while the material 46 enters the recess 54 in male die member 50. The result is a compact 56 provided with a rectangular-shaped opening 58 at one end and a rectangular-shaped boss at the opposite end (see FIGURE 5).

The modification disclosed in FIGURE 1 relies on the forces obtainable in the detonation of chemical explosives to drive the male die members. In some circumstances, however, it may not be desirable to use chemical explosives. In such a case, the necessary explosive forces acting on male die members 18 and 20 can be obtained in other ways. For example, the use of shock waves in a shock wave transmitting medium generated by exploding electric wires or conductive films therein may be used.

Figure 6:
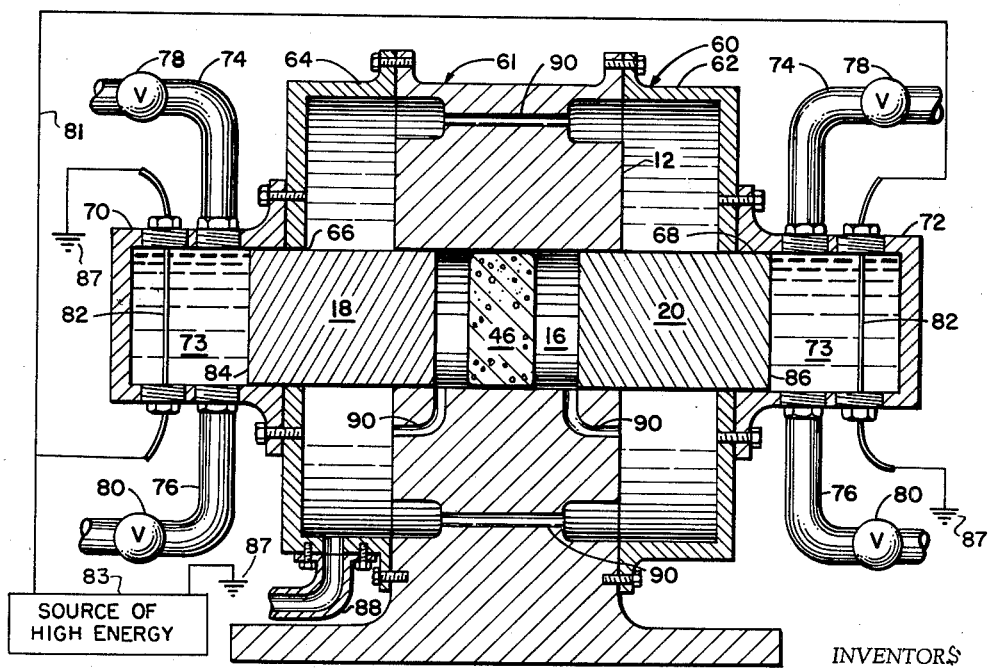
FIGURE 6 is a cross-sectional view of the modified apparatus for compacting material wherein the male die members are explosively driven into the female die members by the force imparted to them by exploding wires in a shock wave transmitting liquid.

In particular, FIGURE 6 discloses a structure indicated generally by the reference numeral 60 which uses the impact force from a shock wave in a shock wave transmitting medium to drive the male die members toward each other in the female die member. In this embodiment, female die 12 is mounted in a housing 61 defined by end sections 62 and 64. These end sections are provided with openings 68 and 66 which are aligned with opening 16 in the female die member. Housings 70 and 72 are attached to end sections 64 and 62 respectively. These housings close off openings 66 and 68 and serve as cylinders in which the piston-like male members 18 and 20 can move. As seen, the male die members 18 and 20 are slidably guided in housings 70 and 72, end sections 64 and 62, and in the female die 12.

Inlet and outlet liquid pipes 74 and 76 are connected to the housings 70 and 72. These liquid pipes are provided with inlet valves 78 and outlet valves 80. With this arrangement the interior of housings 70 and 72 can be filled with a liquid such as water. In addition, an electric wire 82 is removably mounted in each of the housings 70 and 72. Wires 82 are connected by wire 81 to a source of electrical energy 83 which is of sufficient magnitude so that when this source of energy is connected across the wires 82, the wires explode in the liquid. The wires 82 and the source of electrical energy 83 are suitably grounded as at 87. When the wires explode they generate a shock wave in the liquid which impacts on the outer surfaces 84 and 86 of the male die members 18 and 20. This impact forces these male die members toward each other in the interior of the female die member 12 with explosive violence. This force is sufficient to compress the material 46 therebetween.

End section 64 is provided with a gas inlet pipe 88. In addition, the female die 12 is provided with conduits formed therein, permitting the gas entering housing 61 through the gas inlet pipe 88 to penetrate into the interior 16 of the female die 12. As described above, a monatomic gas with a suitably high adiabatic law exponent, such as argon, is inserted into the interior of a die 12. With this arrangement, when the electric wires 82 are exploded causing the male die members 18 and 20 to move toward each other with explosive violence, both the gas and the material 46 to be formed are compressed inside the female die member. As described above in connection with FIGURE 1, the adiabatic heat generated by the compression of the gas in combination with the compression of the material is sufficient to sinter the material and form a dense compact of the refractory material.

It is apparent that the principles described above can be used in conjunction with various other processes such as heat treating, sterilizing, brazing, etc. In addition, the energy source, as described above may be chemical, electrical, or in some circumstances even mechanical.

It is to be understood that the form of the invention herein shown and described is to be taken as a preferred example of the same, and that various changes in the shape, size, and arrangement of the parts may be resorted to without departing from the spirit of this invention or the scope of the claims.

We claim:
1. A method of forming powdered refractory material into a solid form comprising the steps of inserting the powdered material in a female die, surrounding the powdered material in the female die by a monatomic gas atmosphere, and explosively driving a male die member into the female die with enough force to adiabatically compress the powdered material and the gas and thereby cause a rapid and substantial temperature increase in the monatomic gas sufficient to raise the temperature of the material in the female die enough to sinter the powdered material into a solid form.

2. The method described in claim 1 wherein the inert monatomic gas selected has the highest practical adiabatic law exponent.

3. The method described in claim 1 wherein said monatomic gas is argon.

4. A method of forming powdered highly refractory material into a solid form comprising the steps of mixing the highly refractory material with a metal powder, inserting the powdered mixture into a female die, surrounding the mixture in the female die by an insert monatomic gas atmosphere, and explosively driving a male die member into the female die with enough force to adiabatically compress the powdered material and the gas and thereby cause a rapid and substantial temperature increase which is high enough to cause the powdered metal in the mixture to sinter and form a skeleton in which the refractory material will remain embedded.

5. An apparatus of the class described comprising in combination a female die having an interior for holding material to be formed and a predetermined gas therein, said female die having conduits therein communicating with the interior for the introduction of the predetermined gas to the female die interior, a male die member associated with said female die and movable into the interior, and means for explosively moving said male die member into the interior with enough velocity and force to adiabatically compress the introduced predetermined gas and the material in the interior of the said female die to produce a short time high temperature heat source to heat the material, whereby the combination of the high temperature heat source and the force is sufficient to form the material in the female die.

6. The apparatus of claim 5 including valve means associated with said conduits.

7. An apparatus of the class described comprising in combination a female die having an interior for holding material to be formed and a predetermined gas therein, said female die having means therein communicating with the interior for the introduction of the predetermined gas to the female die interior, opposed male die members associated with and drivable into the interior to confine the material to be formed and the gas therebetween, and means associated with said male die members for explosively driving said male die members into the interior toward each other with enough velocity and force to adiabatically compress the introduced monatomic gas and the material therebetween within the interior of the female die to produce a short time high temperature heat source in the interior to heat the material, whereby the combination of the high temperature heat source and force is sufficient to form the material in the female die.

8. An apparatus of the class described comprising in combination a female die having an interior for holding material to be formed and a predetermined gas therein, said female die having means therein communicating with the interior for the introduction of the predetermined gas thereinto, opposed male die members associated with and movable into the interior to confine the material to be formed and the gas therebetween, buffer plates engaging the outer ends of said male die members, and the outer surfaces of said buffer plates adapted to have explosives secured thereto so that, when said explosives are detonated, the force of the explosion is transmitted through said buffer plates and drives the male die members into the interior toward each other with enough velocity and force to adiabatically compress the introduced gas and the material therebetween in the interior of the female die to produce a short time high temperature heat source to heat the material, whereby the combination of the high temperature heat source and force is sufficient to form the material in the female die.

9. An apparatus of the class described comprising in combination a first housing, a female die positioned in said first housing and having an interior for holding a material and a predetermined gas therein, said first housing and said female die having conduit means communicating with the interior for introducing the gas into the female die interior, a second housing secured to said first housing, a piston die disposable in said housings and movable into the interior of said female die, means associated with said second housing for introducing a shock wave transmitting fluid thereinto, an electric wire removably mounted in the shock wave transmitting fluid in said second housing, and the ends of said electric wire extending outside of said second housing for attachment to a source of electric power, whereby the magnitude of the energy in the electric power source is sufficient to explode the electric wire and form a shock wave in the fluid so that the impact of the shock wave on said piston die forces it into the interior of said female die with enough velocity and force to compress adiabatically the gas and material in the interior of the female die and thereby produce a short time high temperature heat source within the interior of the female die with the combination of the effect of the high temperature heat source and pressure on the material in the female die being sufficient to heat and to form the material therein.

References Cited in the file of this patent

UNITED STATES PATENTS

| | | |
|---|---|---|
| 2,648,125 | McKenna et al. | Aug. 11, 1953 |
| 2,711,009 | Redmond et al. | June 21, 1955 |
| 2,943,933 | Lenhart | July 5, 1960 |
| 2,948,923 | Rocco et al. | Aug. 16, 1960 |

FOREIGN PATENTS

| | | |
|---|---|---|
| 774,937 | Great Britain | May 15, 1957 |
| 119,435 | Russia | July 27, 1959 |